Jan. 8, 1924.

C. S. NELSON 1,480,409

FOOT ACCELERATOR

Original Filed Oct. 6, 1920

Inventor
C. S. Nelson,

By Geo. F. Kimmel, Attorney

Patented Jan. 8, 1924.

1,480,409

UNITED STATES PATENT OFFICE.

CHARLES S. NELSON, OF SANDPOINT, IDAHO, ASSIGNOR OF ONE-HALF TO ALLEN P. ASHER, OF SANDPOINT, IDAHO.

FOOT ACCELERATOR.

Application filed October 6, 1920, Serial No. 415,183. Renewed June 20, 1923.

*To all whom it may concern:*

Be it known that I, CHARLES S. NELSON, a citizen of the United States, residing at Sandpoint, in the county of Bonner and State of Idaho, have invented certain new and useful Improvements in Foot Accelerators, of which the following is a specification.

This invention relates to improvements in foot accelerators such as are designed for use in connection with motor vehicles as a conveniently accessible supplement to the usual hand throttle control for the carbureter.

The principal object of the invention is the provision of a device of this character embodying such features of simplicity as to adapt it for convenient application to substantially any type of vehicle.

A further object resides in the provision of a device of this character wherein the motion transmitting device is so associated with its support that the latter may be utilized in varying the tension on the device, such tension being utilized to absorb relative movement of the parts of the accelerator incident to vibration and to return the throttle control mechanism to initial position subsequent to the release of the accelerator rod.

A still further object is the utilization of a chain or other flexible element connecting the usual throttle rod with the crank of the foot accelerator, which, during utilization of the accelerator rod in the control of the carbureter readily compensates for the movement of said accelerator rod by slackening.

With the foregoing and other objects in view, the invention consists in certain novel features of construction as hereinafter shown and described, and specifically pointed out in the claims.

Figure 1:
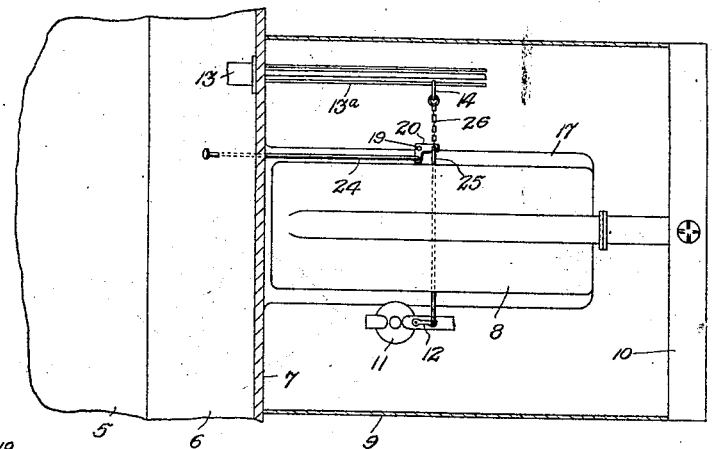
Figure 1 represents a fragmentary horizontal sectional view through a motor vehicle.
Figure 3:
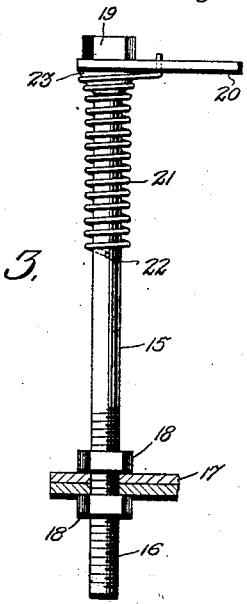
Fig. 3 is an elevation of the support for the bell crank, showing the tensioning means for the latter in detail and also a fragment of a part of the engine to which the support is attached; and, Fig. 4 is a detail sectional view through one terminal of the bell crank illustrating the mode of connecting the usual throttle rod with the foot accelerator crank.
Figure 2:
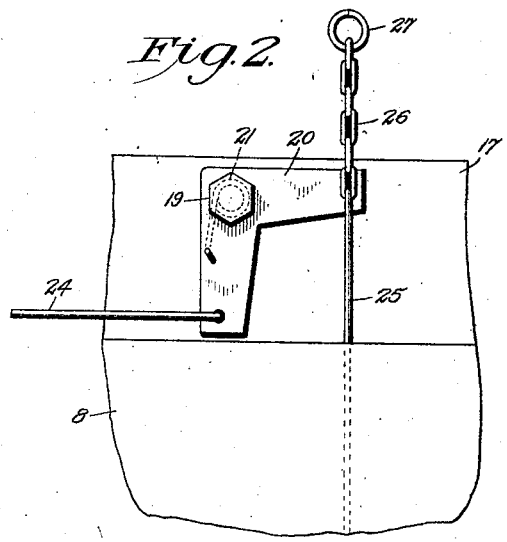
Fig. 2 represents an enlarged top plan view of the bell crank forming a part of the foot accelerator.
Figure 4:
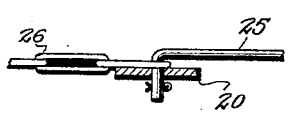

Referring to the drawing in detail, wherein similar reference numerals designate corresponding parts throughout the several views, the numeral 5 indicates a fragment of the horizontal portion of the floor of a motor vehicle having the usual inclined portion 6 which slants upwardly to meet the dash board 7. The engine 8 is housed in the hood 9 behind the radiator 10 and is supplied with gaseous fuel by an approved type of carbureter 11 having the usual throttle valve 12 associated therewith.

As in various widely used types of motor vehicles, the steering post and hand throttle rod 13ª are mounted in a housing, a fragment of which is shown in Fig. 1 and indicated by the numeral 13. An actuating arm 14 is connected with the rod 13ª adjacent its lower extremity and is ordinarily connected directly with the throttle valve 12 by a connecting rod which, however, in applying the present invention to use is dispensed with and the arm 14 is connected with the throttle valve by the mechanism to be hereinafter more fully described.

The invention consists of a supporting post 15 having a threaded lower extremity 16 adapted to be fitted in an adequate aperture formed in the flange or other portion of the base of the explosive engine 8, companion nuts 18 being fitted upon the threaded extremity of the supporting post to rigidly maintain the latter in an upright position. The upper extremity of the supporting post is provided with a head 19 constituting an abutment for a bell crank or substantially L-shaped lever 20 provided medially with an aperture accommodating the supporting post.

A coil spring 21 is coiled about the post 15 and is provided with an angular end anchored in a diametrical aperture 22 formed in the post 15. The upper extremity of the spring 21 bears against the underside of the lever 20 maintaining the latter in facial contact with the underside of the head 19 and preventing loose movement of the parts incident to vibration. The underside of the lever is formed with a circular boss or lug 23 receiving the upper convolutions of the coil spring 21 and preventing undue vibratory movement thereof. The upper extremity of the coil spring is extended at a tangent to the upper convolution and is directed angularly and engaged with an aperture formed intermediate one end of the lever 20 and the supporting post 15. In addition to exerting pressure against the lever to maintain the latter in contact with the head 19, the spring 21 also exerts a rotary influence over the lever 20 and normally tends to shift the later in the direction to close the throttle valve 12, as will hereinafter appear.

The extremity of the lever 20 adjacent the upper terminal of the coil spring 21 is pivotally connected with the front extremity of the foot accelerator rod 24 which extends rearwardly through the inclined portion of the vehicle floor and is movable forwardly under pressure exerted by the foot.

The end of the lever opposite the accelerator rod 24 is connected by a relatively short connecting rod 25 with the throttle valve 12, the arrangement of the rods 24 and 25 and the lever 20 being such that incident to forward movement of the accelerator rod the throttle valve 12 is opened and upon release thereof, the parts are returned to initial position under the influence of the spring 21.

The angular extremity of the connecting rod 25 which engages the lever 20 is passed through one of the links of a chain 26, the opposite extremity of which is equipped with a split ring 27 capable of engagement with the apertured terminal of the arm 14 to establish a connection between the throttle rod 13ᵃ and the lever 20.

In use, the throttle rod 13ᵃ may be utilized in the usual manner to control the valve 12, the opening movement of the valve being effected by a longitudinal pull upon the connecting rod 25. However, when it is preferred to control the engine by the foot rod 24 the latter is pressed forwardly through the inclined portion 6 of the floor of the vehicle to the proper extent, according to the engine speed desired, the movement of the lever 20 relative to the rod 13ᵃ being readily permitted owing to the flexible connecting element 26. As stated, the tendency of the coil spring 21 is to move the lever 20 to such position as to close the throttle valve 12 but in addition to thus effecting the automatic closure of the valve, the spring is further utilized to yieldably maintain the lever 20 in operative position and to absorb relative movement of the parts of the mechanism during vibration incident to the travel of the vehicle. Furthermore, the tension of the spring may be readily varied by rotary adjustment of the supporting post 15, the nuts 18 being loosened preliminary to the adjustment of the post and subsequently tightened to rigidly maintain the post in operative position.

What is claimed is:

1. In a foot accelerator, a supporting post rising from the base of an engine, means for adjusting said post vertically, a lever supported for pivotal movement upon the post, spring means connecting the post with the lever and responsive to rotative adjustments of the post for varying the tension exerted upon the lever and normally maintain the latter in a predetermined position, and throttle valve actuating and foot operated rods connected with the lever.

2. In a foot accelerator, a supporting post attachable to an explosive engine, a head carried by the post, a lever pivotally mounted upon the post, spring means normally maintaining the lever in a predetermined position relative to the post and also maintaining the lever in engagement with the head of the post, means for connecting the lever with the throttle valve of an explosive engine, and a foot operated rod connected with the lever.

In testimony whereof I affix my signature.

CHARLES S. NELSON.

In presence of—
ALLEN P. ASHER,
PAUL M. BOWER.